United States Patent
Miwa et al.

(10) Patent No.: US 12,442,001 B2
(45) Date of Patent: Oct. 14, 2025

(54) DOUBLE STRANDED RNA SPECIFICALLY INHIBITING EXPRESSION OF IL-23 AND PHARMACEUTICAL COMPOSITION COMPRISING SAME

(71) Applicant: MEDRx Co., Ltd., Kagawa (JP)

(72) Inventors: Yasushi Miwa, Higashikagawa (JP); Hidetoshi Hamamoto, Higashikagawa (JP); Tatsuhiro Ishida, Tokushima (JP)

(73) Assignee: MEDRX CO., LTD., Kagawa (JP)

( * ) Notice: Subject to any disclaimer, the term of this patent is extended or adjusted under 35 U.S.C. 154(b) by 579 days.

(21) Appl. No.: 17/916,060

(22) PCT Filed: Apr. 2, 2021

(86) PCT No.: PCT/JP2021/014321
§ 371 (c)(1),
(2) Date: Sep. 30, 2022

(87) PCT Pub. No.: WO2021/201276
PCT Pub. Date: Oct. 7, 2021

(65) Prior Publication Data
US 2023/0167448 A1    Jun. 1, 2023

(30) Foreign Application Priority Data

Apr. 3, 2020 (JP) .................. 2020-067837

(51) Int. Cl.
*C12N 15/113* (2010.01)
*A61P 17/06* (2006.01)

(52) U.S. Cl.
CPC .......... *C12N 15/1136* (2013.01); *A61P 17/06* (2018.01); *C12N 2310/11* (2013.01); *C12N 2310/30* (2013.01)

(58) Field of Classification Search
CPC ............ C12N 15/1136; C12N 2310/11; C12N 2310/30; C12N 2310/14; A61P 17/06; A61K 31/713; A61K 47/12; A61K 47/18; A61K 48/00
See application file for complete search history.

(56) References Cited

U.S. PATENT DOCUMENTS

| | | |
|---|---|---|
| 2005/0222071 A1 | 10/2005 | Duranton et al. |
| 2013/0122009 A1 | 5/2013 | Presta et al. |
| 2015/0361396 A1 | 12/2015 | Regev et al. |

FOREIGN PATENT DOCUMENTS

| | | |
|---|---|---|
| JP | 2005-530812 A | 10/2005 |
| JP | 2016-525873 A | 9/2016 |
| JP | 2017-060482 A | 3/2017 |
| WO | 2007/076524 A2 | 7/2007 |

OTHER PUBLICATIONS

International Preliminary Report on Patentability and Written Opinion issued in corresponding International Patent Application No. PCT/JP2021/014321 dated Sep. 29, 2022.
Hawkes et al., "Psoriasis pathogenesis and the development of novel targeted immune therapies," Journal of Allergy and Clinical Immunology, 140: 645-653 (2017).
Yamaguchi et al., "Differential regulation of IL-23 production in M1 macrophages by TIR8/SIGIRR through TLR4- or TLR7/8-mediated signaling," Cytokine, 99: 310-315 (2017).
Bak et al., Targeting of human interleukin-12B by small hairpin RNAs in xenografted psoriatic skin, BMC Dermatology, 11: 5 (2011).
Bruck et al., "Treatment of autoimmune disease with siRNA targeting p40," Experimental Dermatology, 22: e9: P046 (2013).
Sakamoto et al., The 36th Annual Meeting of the Japan Society of Drug Delivery System), non-official translation (Development of novel psoriasis therapy by transdermal transdermalization of SiRNA using ionic liquid), 139:1-C-18 (Aug. 10, 2020).
International Search Report issued in corresponding International Patent Application No. PCT/JP2021/014321 dated Jun. 15, 2021.

*Primary Examiner* — J. E. Angell
(74) *Attorney, Agent, or Firm* — Morgan, Lewis & Bockius LLP

(57) ABSTRACT

The present invention provides a novel siRNA specifically inhibiting the expression of IL-23 and a pharmaceutical composition comprising the siRNA specifically a double stranded RNA comprising a sense strand and an antisense strand wherein each strand has 19 to 30 nucleotides and comprises the base sequence selected from SEQ ID NO: 2, SEQ ID NO: 3, SEQ ID NO: 4, SEQ ID NO: 5 or SEQ ID NO: 6 or a complementary base sequence thereof and a pharmaceutical composition comprising the double stranded RNA.

14 Claims, 7 Drawing Sheets
Specification includes a Sequence Listing.

[Fig. 1]
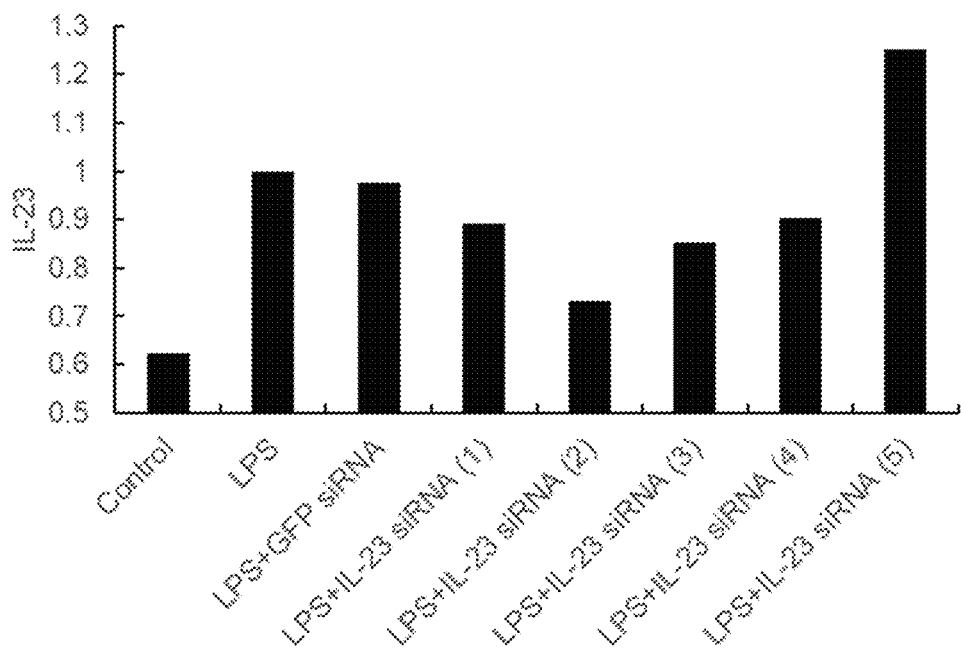
[Fig. 2]
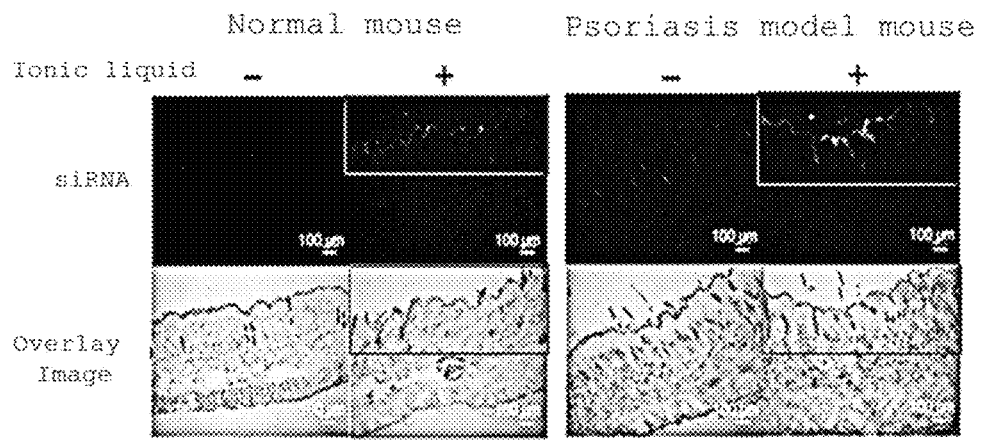

[Fig. 3]
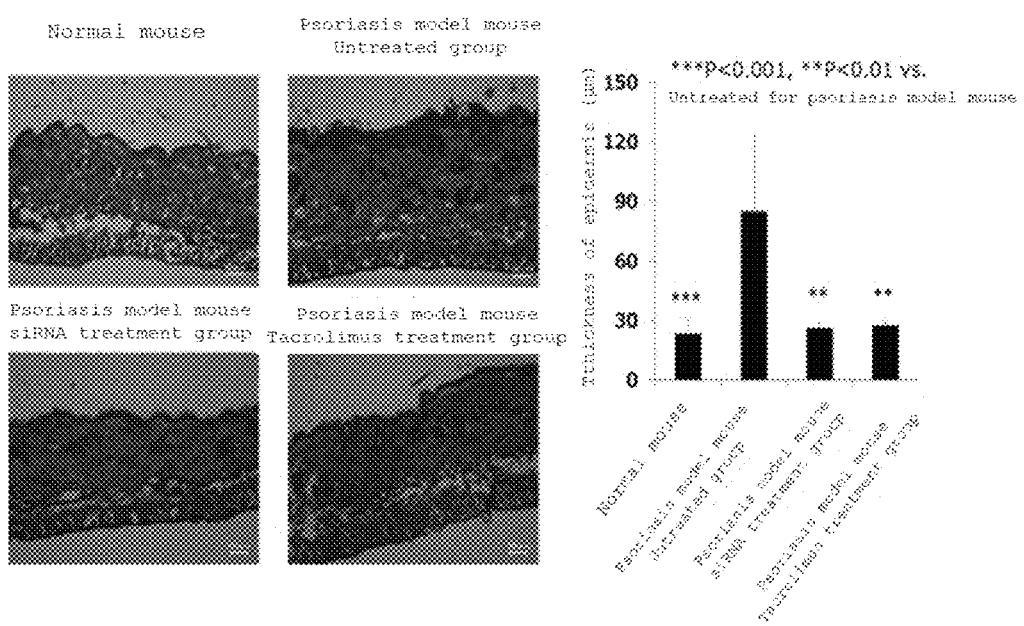

[Fig. 4]
Normal mouse
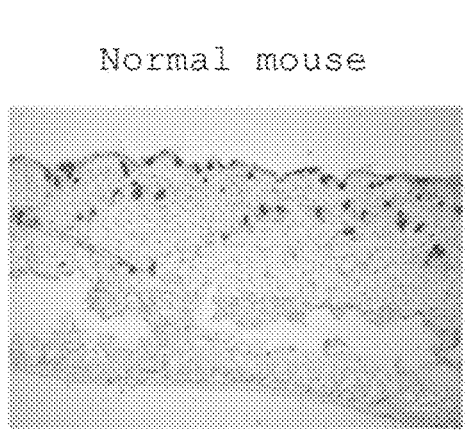
Psoriasis model mouse
Untreated group
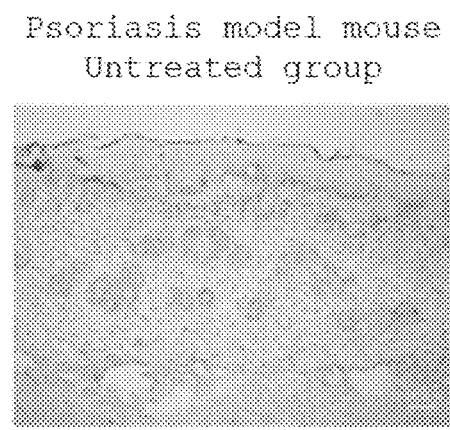
Psoriasis model mouse
siRNA treatment group
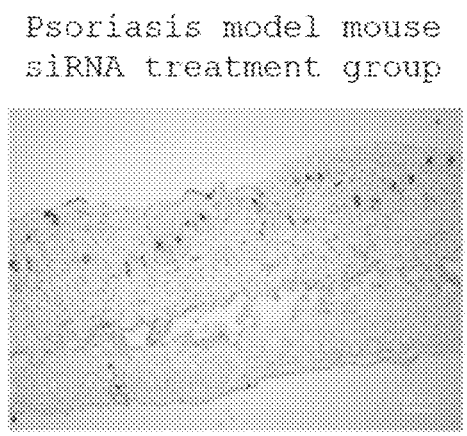
Psoriasis model mouse
Tacrolimus treatment group
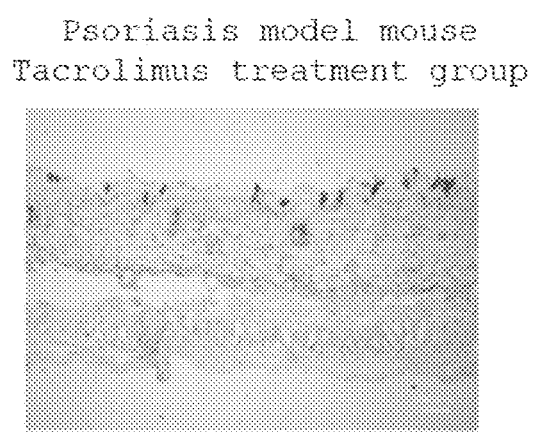

[Fig. 5]
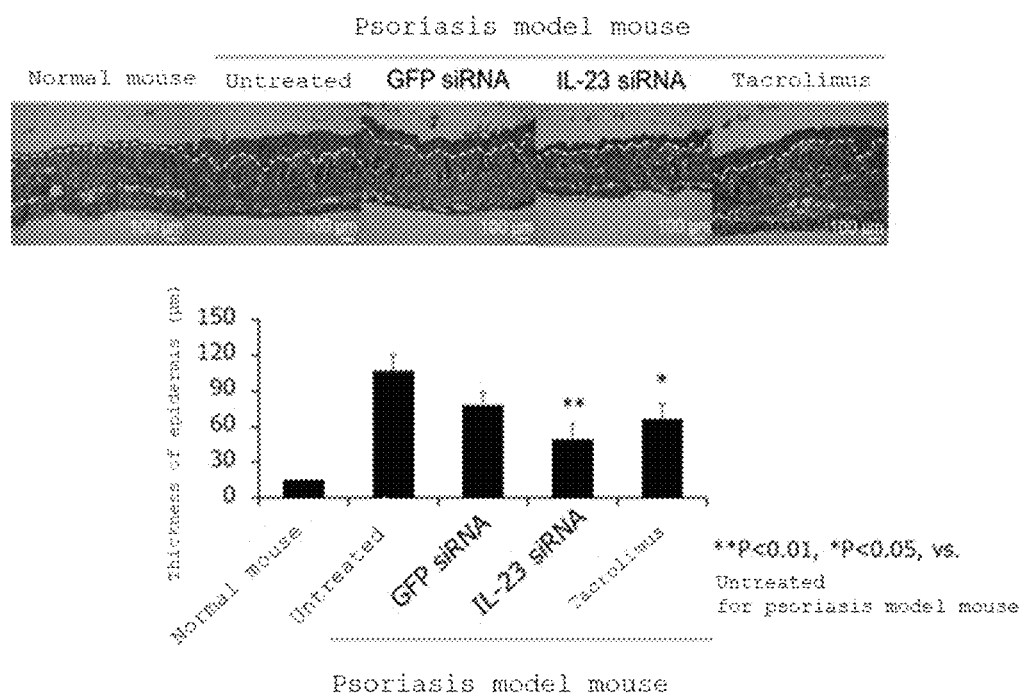
[Fig. 6]
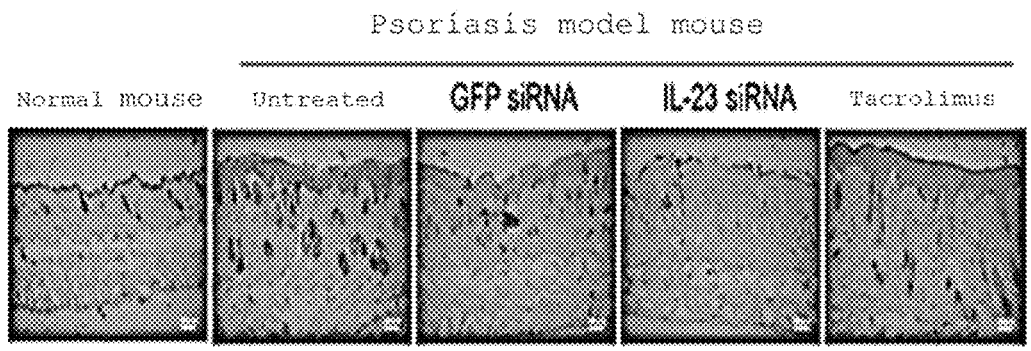

[Fig. 7]
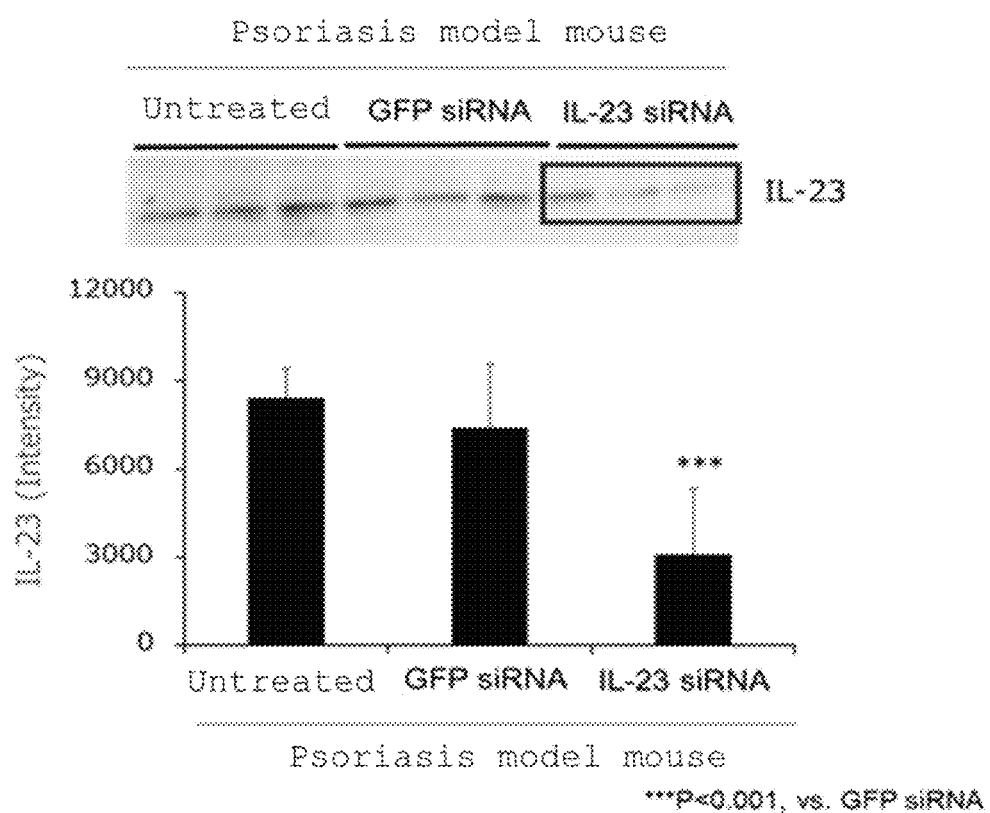

[Fig.8]
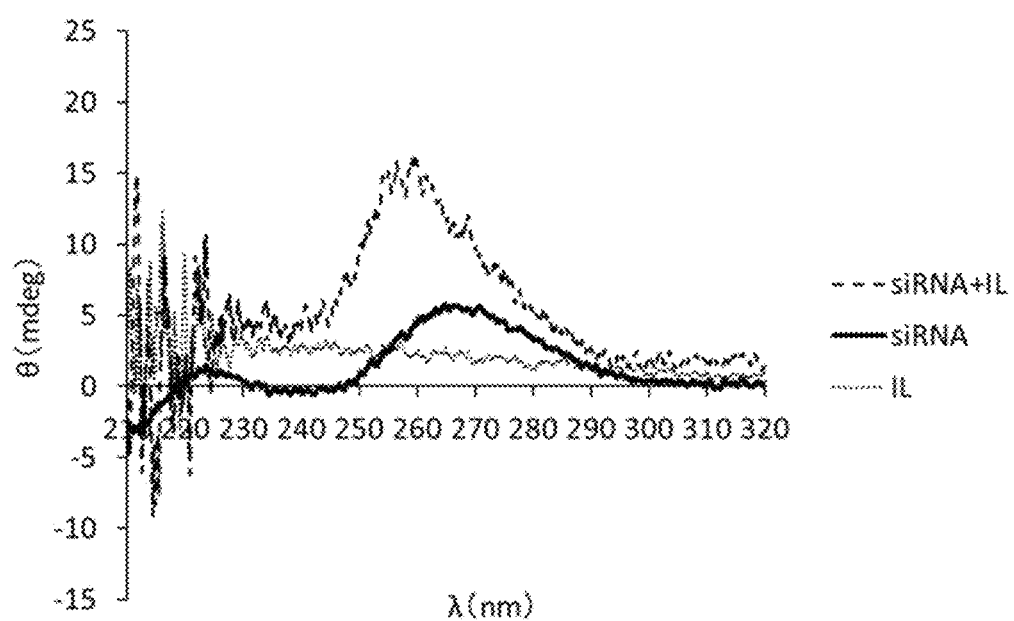

[Fig. 9]
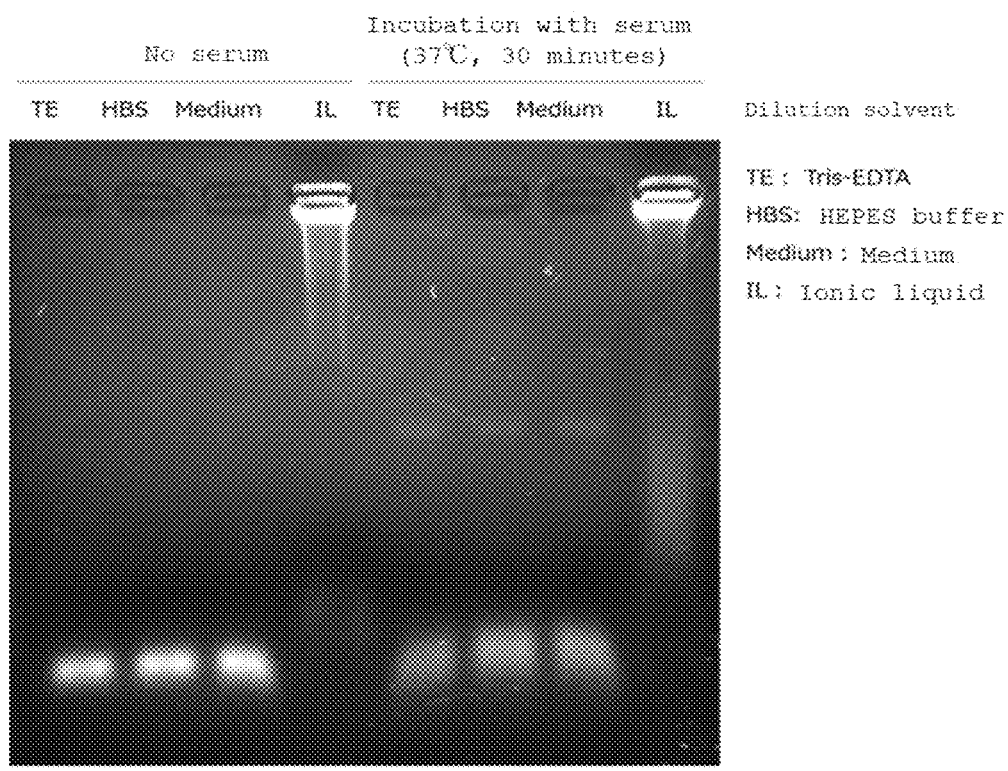

DOUBLE STRANDED RNA SPECIFICALLY INHIBITING EXPRESSION OF IL-23 AND PHARMACEUTICAL COMPOSITION COMPRISING SAME

A computer readable text file, entitled "SequenceListing.txt," created on or about Sep. 29, 2022 with a file size of 6,328 bytes contains the sequence listing for this application and is hereby incorporated by reference in its entirety.

TECHNICAL FIELD

The present invention relates to a double stranded RNA specifically inhibiting the expression of IL-23 and a pharmaceutical composition comprising the double stranded RNA. More specifically, the present invention relates to siRNA specifically inhibiting the expression of IL-23 and a preparation comprising the siRNA and an ionic liquid.

BACKGROUND ART

Psoriasis is a skin topical disease with erythema reddening the skin, silvery-white fine scales covering the skin surface, skin thickness caused by hyperproliferation of corneocytes and inflammation caused by immune cell invasion. Also, psoriasis is classified into some types of psoriasis, specifically psoriasis vulgaris, arthropathic psoriasis (psoriatic arthritis), guttate psoriasis, psoriatic erythroderma and pustular psoriasis.

In the treatment of psoriasis, a steroidal or non-steroidal anti-inflammatory agent has been often used to alleviate the symptoms of psoriasis. However, the treatment with such agent for a long time leads to chronic inflammation and side effects such as gastric ulcer caused by a steroidal anti-inflammatory agent. Hence, it has been desired to develop a medicament for treating psoriasis with high safety.

The mechanism of developing psoriasis is still unclear, but it has been reported that IL-23 is produced by dendritic cells activated by autoantigens, the produced IL-23 activates Th17 cells, IL-17 is produced by the activated Th17 cells, the produced IL-17 stimulates corneocytes to cause the hyperproliferation of corneocytes and various inflammatory responses, and psoriasis is finally developed due to them (Non-Patent Document 1).

Patent Document 1 describes that the modulation of Th17 cell differentiation is useful for the treatment of an autoimmune disease and/or an inflammatory disease. That is, it has been shown that IL-23 is associated with the diseases.

The inhibition of IL-23 expression may be useful for treating the development of various diseases such as psoriasis and their progression, and thus IL-23 has been a new target for treating various diseases such as psoriasis. In the fact, development of monoclonal antibodies specifically inhibiting the subunit protein of IL-23, p19 is progressing (Patent Documents 2 and 3), and Tremfya®, which is a human anti-IL-23p19 monoclonal antibody, has been approved as a medicament for treating psoriasis. However, antibody drugs such as Tremfya® produce higher therapeutic effects, whereas there is the risk of developing systemic side effects because they are used as injectable preparations. Also, there are disadvantages that strong pain caused by using as an injectable preparation causes heavy mental and physical burdens, the equipment for injection is required, and antibody drugs are expensive.

Therefore, nucleic acid drugs have been focused as one of candidates to replace antibody drugs, and siRNA has been actively studied among them. siRNA is a double stranded RNA with about 21 to 23 base pairs (Molecular Weight: about 13300), and can inhibit specific gene expression because of the specific cleavage of mRNA of a target protein. Hence, siRNA is expected to produce higher effects of treating diseases associated with the gene. In addition, there are advantages that the preparation of siRNA is relatively easy compared to that of antibody drugs because siRNA can be prepared by a similar chemical synthesis technique to that of small molecule compounds, and siRNAs can be prepared inexpensively.

siRNA inhibiting the expression of IL-23 has been already reported (Non-Patent Document 2). However, since there are various types of psoriasis, siRNA with higher effects has been required to select an appropriate therapeutic agent depending on each type of psoriasis.

In addition, the research and development of pharmaceutical products using siRNA have been actively performed. On the other hand, most of the current candidates for siRNA pharmaceutical products are in the form of injectable preparations. Since siRNA is a water-soluble polymer, it was very difficult to simple apply siRNA to the skin and deliver it into the skin by passive diffusion. Also, siRNA was easily hydrolyzed and cleaved by a nuclease which is a nucleic acid degrading enzyme inside and outside cells. As a result, siRNA could not inhibit gene expression in vivo, and thus it was thought that siRNA could not be used in the forms of preparations other than injectable preparations. In fact, no preparation for transdermal administration comprising siRNA has been in the market.

PRIOR ART DOCUMENTS

Patent Documents

Patent Document 1: JP 2016-525873
Patent Document 2: WO 2007/076524
Patent Document 3: JP 2017-060482

Non-Patent Documents

Non-Patent Document 1: J. Allergy Clin. Immunol., 2017, 140, 645-653
Non-Patent Document 2: Cytokine. 2017 November; 99:310-315.

SUMMARY OF INVENTION

Problem to be Solved by the Invention

The object of the present invention is to find a novel double stranded RNA specifically inhibiting the expression of IL-23 and to provide a clinically-applicable preparation comprising siRNA, particularly a preparation for transdermal administration comprising siRNA which improves the low cell permeability and is not degraded by nuclease.

Means for Solving the Problems

The present inventors have extensively studied to reach the object, and have found that a specific siRNA targeting the p19 subunit mRNA of IL-23 effectively inhibits the expression of IL-23 in cells and also improves the symptoms of psoriasis in psoriasis model mouse. In addition, the present inventors have found that the use of an aliphatic carboxylic acid-based ionic liquid improves the permeation of siRNA into the skin with improving the stability of siRNA. Based upon the new findings, the present invention has been completed.

That is, the present invention provides the following embodiments.

[Item 1] A double stranded RNA comprising a sense strand and an antisense strand, wherein each of the strands has 19 to 30 nucleotides and comprises a base sequence selected from SEQ ID NO: 2, SEQ ID NO: 3, SEQ ID NO: 4, SEQ ID NO: 5 or SEQ ID NO: 6 or a complementary base sequence thereof.

[Item 2] The double stranded RNA according to item 1, wherein each of the strands has 19 to 25 nucleotides.

[Item 3] The double stranded RNA according to item 1 or 2, wherein one or more nucleotides within each of the strands are chemically modified or the 5'-terminal or 3'-terminal nucleotide in each of the strands is chemically modified.

[Item 4] The double stranded RNA according to item 3, wherein said chemical modification is selected from the group consisting of phosphorothioate modification, 2'-F modification, 2'-OMe modification, 2'-MOE modification, LNA modification and ENA modification.

[Item 5] The double stranded RNA according to any one of items 1 to 4, which comprises 1 to 10 deoxyribonucleotides in the 3'-end of the sense strand and the 5'-end of the antisense strand.

[Item 6] The double stranded RNA according to item 5, which comprises 2 thymidines (dTs) in the 3'-end of the sense strand and the 5'-end of the antisense strand. [Item 7] The double stranded RNA according to any one of items 1 to 6 for specifically inhibiting the expression of IL-23.

[Item 8] A pharmaceutical composition comprising the double stranded RNA according to any one of items 1 to 7.

[Item 9] The pharmaceutical composition according to item 8, which further comprises an aliphatic carboxylic acid-based ionic liquid.

[Item 10] The pharmaceutical composition according to item 9, wherein the aliphatic carboxylic acid-based ionic liquid is a mixed ionic liquid comprising two or more aliphatic carboxylic acid-based ionic liquids.

[Item 11] The pharmaceutical composition according to item 10, wherein the mixed ionic liquid is
a) one or more aliphatic carboxylic acid-based ionic liquids of 2 to 7 carbon atoms consisting of a lower aliphatic carboxylic acid of 2 to 7 carbon atoms and any of ethanolamine, diethanolamine or triethanolamine, and
b) an aliphatic carboxylic acid-based ionic liquid of 2 to carbon atoms in which the solubility of the double stranded RNA is 1 w/w % or less.

[Item 12] The pharmaceutical composition according to any one of items 8 to 11 which is a transdermal absorption preparation.

[Item 13] The pharmaceutical composition according to any one of items 8 to 12 for treating a disease associated with the expression of IL-23.

[Item 14] The pharmaceutical composition according to item 13, wherein the disease is psoriasis.

In addition, the present invention provides the following embodiments.

[Item 15] A method of treating a disease associated with the expression of IL-23, which comprises administering the double stranded RNA according to any one of items 1 to 6 to a patient in need thereof.

[Item 16] The method according to item 15, wherein the disease is psoriasis.

[Item 17] Use of the double stranded RNA according to any one of items 1 to 6 in the manufacture of a medicament for treating a disease associated with the expression of IL-23.

[Item 18] The use according to item 17, wherein the disease is psoriasis.

[Item 19] A double stranded RNA according to any one of item 1 to 6 for treating a disease associated with the expression of IL-23.

[Item 20] The double stranded RNA according to item 19, wherein the disease is psoriasis.

[Item 21] A method of preparing a preparation for transdermal administration comprising double stranded RNA, comprising:
(1) mixing an aliphatic carboxylic acid with an organic amine to produce an ionic liquid;
(2) dissolving the double stranded RNA according to any one of items 1 to 6 into the resulting ionic liquid to produce an ionic liquid solution comprising the double stranded RNA; and
(3) mixing the ionic liquid solution comprising the double stranded RNA produced in said step (2) with another ionic liquid to produce a drug solution.

[Item 22] An expression vector the double stranded RNA according to any one of items 1 to 6.

[Item 23] A cell comprising the expression vector according to item 22.

Effects of the Invention

The double stranded RNA of the present invention can specifically inhibit The expression of IL-23, and thus can be used for the treatment of a disease associated with IL-23 such as psoriasis. Also, the pharmaceutical composition of the present invention can produce high stability of the double stranded RNA, which is an active ingredient, in the pharmaceutical composition and high skin permeability of the double stranded RNA and effectively deliver the double stranded RNA in each affected area by the use of an ionic liquid, and thus can be used as a transdermal absorption preparation. The double stranded RNA of the present invention is highly stable in a preparation, and thus can be used in low amounts and is expected to be used as an agent for treating psoriasis with more excellent stability and economy.

BRIEF DESCRIPTION OF THE DRAWINGS

FIG. 1 shows the results of the Western blotting in controls (Control, LPS, LPS+GFP siRNA) and siRNAs of the present invention (LPS+siRNA (No. 1) to siRNA (No. 5)), and shows the ratios of the expressed amounts of IL-23 in Control, GFP siRNA and siRNA (No. 1) to siRNA (No. 5) to the expressed amount of IL-23 in the cell lysate containing LPS alone defined as 1.

FIG. 2 shows the images of fluorescently-labeled siRNA in the absence and presence of an ionic liquid for normal mouse and psoriasis model mouse as well as the overlay images of each image and the bright-field image of skin tissue. In the images, siRNAs are presented in the area enclosed by the square and siRNAs are mainly presented near the stratum corneum and partially in the epidermis.

FIG. 3 shows the images of the skin tissues with HE staining for normal mouse and mild psoriasis model mouse of each group as well as the thickness of the epidermis (μm) for each mouse.

FIG. 4 shows the images of the skin tissues immunostained with Ki-67 for normal mouse and mild psoriasis model mouse of each group.

FIG. 5 shows the images of the skin tissues with HE staining for normal mouse and severe psoriasis model mouse of each group as well as the thickness of the epidermis (µm) for each mouse.

FIG. 6 shows the images of the skin tissues immunostained with Ki-67 for normal mouse and severe psoriasis model mouse of each group.

FIG. 7 shows the results of each Western blotting of the untreated group, the GFP siRNA treatment group and the IL-23 siRNA treatment group for severe psoriasis model mouse as well as the expressed amounts of IL-23 in the skin tissues of each group FIG. 8 shows the CD spectra of siRNA dissolved in an ionic liquid (IL), siRNA dissolved in water and the ionic liquid (IL).

FIG. 9 shows the results of agarose gel electrophoresis of siRNA dissolved in the dilution solvent (Tris-EDTA (TE), HEPES buffer (HBS), RPMI1640 medium or ionic liquid (IL))

DESCRIPTION OF EMBODIMENTS

The present invention provides a double stranded RNA specifically inhibiting the expression of IL-23, and a pharmaceutical composition comprising said double stranded RNA for treating a disease associated with the expression of IL-23 such as skin disease (e.g., psoriasis).

As used herein, the term "double stranded RNA" refers to a double stranded nucleic acid molecule in which two RNA strands having a targeted base sequence and a complementary base sequence thereof are bound in opposite directions. Examples thereof include siRNA, shRNA, miRNA, but are not limited thereto. The double stranded RNA of the present invention is preferably siRNA.

The double stranded RNA of the present invention is formed by hybridizing an antisense strand complementary to the target sequence of the p19 subunit mRNA of IL-23 and a sense strand having a complementary sequence to such antisense strand, and has the effect of cleaving target RNA (RNA interference) and the function to inhibit the expression of IL-23.

The sense strand and antisense strand in the double stranded RNA of the present invention may be the same or different t in length. Each of the strands has 19 to 30 nucleotides, preferably 25 19 to nucleotides, more preferably 19 to 23 nucleotides, furthermore preferably 19 to 21 nucleotides or 19 nucleotides.

The double stranded RNA of the present invention may comprise a double stranded RNA in which one or more nucleotides within each of the strands are chemically modified and a double stranded RNA in which the 5'-terminal or 3'-terminal nucleotide is chemically modified. The chemical modification produces the resistance to nucleases which are nucleic acid degrading enzymes and enhances the in vivo stability of RNA. Examples of the chemical modification include phosphorothioate modification, 2'-F modification, 2'-OMe modification, 2'-MOE modification, LNA modification, ENA modification, but are not limited thereto. In addition, the chemical modification may utilize any method well known in the art, but is not limited thereto.

Both ends of sense and antisense strands in the double stranded RNA of the present invention may be blunt ends and protruding ends (overhangs).

The protruding ends of each of the strands in the double stranded RNA of the present invention have 1 to 10 nucleotides, preferably 1 to 5 nucleotides, and more preferably 1 to 2 nucleotides, respectively. The protruding ends of each of the strands may be the same or different in length. The nucleotides in the protruding ends may be deoxyribonucleotides. The double stranded RNA of the present invention preferably comprises 2 thymidines (dTs) in the 3'-end of the sense strand and the 5'-end of the antisense strand.

The double stranded RNA of the present invention may form a loop structure from several nucleotides of both the 3'-end of the sense strand and the 5'-end of the antisense strand or several nucleotides of both the 5'-end of the sense strand and the 3'-end of the antisense strand. Examples of the double stranded RNA with a loop structure include siRNA with the loop structure formed from 2 nucleotides of the 3'-end of the sense strand and 2 nucleotides of the 5'-end of the antisense strand.

The double stranded RNA of the present invention may contain at least one mismatch as far as the effect of inhibiting the expression of IL-23 is produced by hybridizing the antisense strand of the double stranded RNA of the present invention with a target sequence thereto. For example, the double stranded RNA of the present invention contains 1 substituted base.

The double stranded RNA of the present invention is preferably siRNAs formed from each of sense sequences and antisense sequences of (1) to (5) in Table below.

TABLE 1

| siRNA No. | Antisense sequence (SEQ ID No.) | Sense sequence (SEQ ID No.) |
| --- | --- | --- |
| (1) | 3'-UAUUACUGCUCUGCAAUCC-5' (2) | 5'-GGAUUGCAGAGCAGUAAUA-3' (7) |
| (2) | 3'-AGUAGAUUCAUAUGUCCCG-5' (3) | 5'- CGGGACAUAUGAAUCUACU-3' (8) |
| (3) | 3'-UUUUAGUCUCUUCAUCCUC-5' (4) | 5'-GAGGAUGAAGAGACUAAAA-3' (9) |
| (4) | 3'-UAAAAAGCCAGACCUUGGC-5' (5) | 5'-GCCAAGGUCUGGCUUUUUA-3' (10) |
| (5) | 3'-AAAAAGGCCUGGAGGCUUC-5' (6) | 5'-GAAGCCUCCAGGCCUUUUU-3' (11) |

In addition, siRNAs in which 2 thymidines (dTs) are bound to the 3'-end of each sense strand and the 5'-end of each antisense strand of the above siRNA (No. 1) to (No. 5), respectively, are as follows.

TABLE 2

| siRNA No. | Antisense sequence (SEQ ID No.) | Sense sequence (SEQ ID No.) |
| --- | --- | --- |
| (1') | 3'-UAUUACUGCUCUGCAAUCCdTdT-5' (12) | 5'-GGAUUGCAGAGCAGUAAUAdTdT-3' (17) |
| (2') | 3'-AGUAGAUUCAUAUGUCCCGdTdT-5' (13) | 5'-CGGGACAUAUGAAUCUACUdTdT-3' (18) |
| (3') | 3'-UUUUAGUCUCUUCAUCCUCdTdT-5' (14) | 5'-GAGGAUGAAGAGACUAAAAdTdT-3' (19) |
| (4') | 3'-UAAAAAGCCAGACCUUGGCdTdT-5' (15) | 5'-GCCAAGGUCUGGCUUUUUAdTdT-3' (20) |
| (5') | 3'-AAAAAGGCCUGGAGGCUUCdTdT-5' (16) | 5'-GAAGCCUCCAGGCCUUUUUdTdT-3' (21) |

The double stranded RNA of the present invention may be prepared according to any known preparation method, for example, by in vitro chemical synthesis. For example, the chemical synthesis may be performed by a nucleic acid synthesizer using amidite resin containing a nucleic acid molecule for constituting a double stranded RNA as a starting material.

The double stranded RNA of the present invention reduces the expressed amount of IL-23 in dendritic cells, and also produces the effects of improving the skin symptoms of psoriasis such as the reduction in thickness of the epidermis and the inhibition of the proliferation of keratinocytes in the skin of psoriasis model mouse. Hence, the double stranded RNA of the present invention may be used as a pharmaceutical composition (medicament).

The pharmaceutical composition of the present invention comprises a double stranded RNA. In an embodiment, the pharmaceutical composition is preferably a pharmaceutical composition comprising a double stranded RNA and an aliphatic carboxylic acid-based ionic liquid, and more preferably an external preparation comprising a double stranded RNA and an aliphatic carboxylic acid-based ionic liquid.

As used herein, the term "aliphatic carboxylic acid-based ionic liquid" refers to a Brønsted salt prepared from an aliphatic carboxylic acid and an organic cation, which is in a viscous liquid form at ambient temperature and is a melting point of 100° C. or less. The aliphatic carboxylic acid-based ionic liquid may be prepared by mixing an aliphatic carboxylic acid and an organic cation in equimolar amounts or excess amounts at room temperature or with heating. The excess amounts of the aliphatic carboxylic acid and/or organic cation are preferably within 0.2 time molar amounts. Also, the aliphatic carboxylic acid-based ionic liquid of the present invention may be prepared from an aliphatic carboxylic acid and a drug having an amine structure.

As used herein, the term "aliphatic carboxylic acid" refers to a carboxylic acid having one or more carboxyl groups. The carbon chain in the aliphatic carboxylic acid may be straight or branched and saturated or unsaturated. In addition, the aliphatic carboxylic acid may be another group(s) other than carboxyl group, and the number and type of the group(s) are not particularly limited. Examples of the group(s) include amino group, hydroxyl group.

Examples of the aliphatic carboxylic acid include an aliphatic carboxylic acid having 2 to 20 carbon atoms. Examples of the aliphatic carboxylic acid having 2 to 20 carbon atoms include a short-chain fatty acid and keto acid of 2 to 7 carbon atoms, a medium-chain fatty acid of 8 to 12 carbon atoms and a higher fatty acid of 13 to 20 carbon atoms.

Examples of the aliphatic carboxylic acid of the present invention include glycolic acid, methoxyacetic acid, levulinic acid, hexanoic acid, 2-ethylhexanoic acid, octanoic acid, decanoic acid, lauric acid, myristic acid, palmitic acid, stearic acid, isostearic acid, oleic acid. Among them, levulinic acid and isostearic acid are preferable.

As used herein, the term "organic cation" refers to a cationic organic compound, and examples thereof include an organic amine, an organic quaternary ammonium cation, an organic quaternary phosphonium cation. Examples of the organic amine include an organic amine of 4 to 12 carbon atoms. Among them, ethanolamine, diethanolamine, triethanolamine, isopropanolamine, diisopropanolamine and triisopropanolamine are preferable.

The pharmaceutical composition of the present invention may comprise a double stranded RNA and an aliphatic carboxylic acid-based mixed ionic liquid. As used herein, the term "aliphatic carboxylic acid-based mixed ionic liquid" refers to an ionic liquid prepared by mixing two or more of said aliphatic carboxylic acid-based ionic liquids (e.g., aliphatic carboxylic acid-based ionic liquids of 2 to carbon atoms), and encompasses three types of mixed ionic liquids which are a mixed ionic liquid prepared by using a common aliphatic carboxylic acid and changing the organic cation (organic amine), a mixed ionic liquid prepared by using a common organic cation (organic amine) and changing the aliphatic carboxylic acid, and a mixed ionic liquid preparing using different aliphatic carboxylic acid and organic cation (organic amine).

Examples thereof include an aliphatic carboxylic acid-based mixed ionic liquid comprising a) one or more aliphatic carboxylic acid-based ionic liquids of 2 to 7 carbon atoms consisting of a lower aliphatic carboxylic acid of 2 to 7 carbon atoms and any of ethanolamine, diethanolamine or triethanolamine and b) an aliphatic carboxylic acid-based ionic liquid of 2 to 20 carbon atoms in which the solubility of double stranded RNA is 1 w/w % or less and an aliphatic carboxylic acid-based mixed ionic liquid comprising the aliphatic carboxylic acid-based mixed ionic liquid and c) an organic solvent dissolved in the aliphatic carboxylic acid-based mixed ionic liquid in which the solubility of double stranded RNA is 1 w/w % or less.

As used herein, the term "lower aliphatic carboxylic acid-based ionic liquid of 2 to 7 carbon atoms" refers to an ambient temperature molten salt or an equilibrium mixture of each equimolar amount of a lower aliphatic carboxylic acid of 2 to 7 carbon atoms and any of three types of organic amines consisting of ethanolamine, diethanolamine and triethanolamine. The aliphatic carboxylic acid and/or organic amine may be added in excess amounts in view of the concentration of the double stranded RNA used and the influence of additives. The excess amounts thereof are preferably within 0.2 time molar amounts.

Also, the aliphatic carboxylic acid-based ionic liquid of 2 to 7 carbon atoms may be used alone or as a mixed ionic liquid comprising two or more of the aliphatic carboxylic acid-based ionic liquids (including an ionic liquid whose organic amine compound is different).

The aliphatic carboxylic acid-based ionic liquid of 2 to 7 carbon atoms is preferably a salt of glycolic acid with diethanolamine, a salt of glycolic acid with triethanolamine, a salt of methoxyacetic acid with diethanolamine, a salt of methoxyacetic acid with triethanolamine, a salt of levulinic acid with diethanolamine or a salt of levulinic acid with triethanolamine, and more preferably a salt of levulinic acid with diethanolamine or a salt of levulinic acid with triethanolamine.

The "aliphatic carboxylic acid-based mixed ionic liquid" prepared by diluting the aliphatic carboxylic acid-based ionic liquid of 2 to 7 carbon atoms may be used in any amount required to dissolve a double stranded RNA and maintain proper solubility of the double stranded RNA. The amount varies depending on the amount of the double stranded RNA in a preparation. The amount is preferably 0.1 to 30 w/w %, and more preferably 0.1 to 10 w/w %.

As used herein, the term "aliphatic carboxylic acid-based ionic liquid of 2 to 20 carbon atoms" refers to an ambient temperature molten salt or an equilibrium mixture of each equimolar amount of an aliphatic carboxylic acid of 2 to 20 carbon atoms and an organic amine of 4 to 12 carbon atoms. The aliphatic carboxylic acid and/or organic amine may be added in excess amounts in view of the concentration of the double stranded RNA used and the influence of additives. The excess amounts thereof are preferably within 0.2 time molar amounts.

When a medium-chain fatty acid of 8 to 12 carbon atoms is used as the aliphatic carboxylic acid, the aliphatic carboxylic acid-based ionic liquid is preferably a salt of the fatty acid with ethanolamine, diethanolamine, triethanolamine, isopropanolamine, diisopropanolamine or triisopropanolamine. More preferably, it is a salt of decanoic acid with diisopropanolamine and a salt of decanoic acid with triisopropanolamine.

When a higher fatty acid of 13 to 20 carbon atoms is used as the aliphatic carboxylic acid, the aliphatic carboxylic acid-based ionic liquid is preferably a salt of the fatty acid with a similar organic amine to the medium-chain fatty acid. More preferably, it is a salt of isostearic acid with diisopropanolamine and a salt of isostearic acid with triisopropanolamine.

The pharmaceutical composition of the present invention may comprise an expression vector in which the double stranded RNA of the present invention can be expressed into a subject to be administered or a cell comprising such expression vector in place of such double stranded RNA.

The pharmaceutical composition of the present invention can treat and/or prevent a disease associated with the expression of IL-23 because the double stranded RNA therein produces the effect for inhibiting the expression of IL-23.

As used herein, the "disease associated with the expression of IL-23" includes psoriasis, rheumatoid arthritis, osteoarthritis, reactive arthritis, psoriatic arthritis, bone loss, airway hypersensitivity, chronic obstructive pulmonary disease, demyelinating disease, multiple sclerosis, skin hypersensitivity, acute transplant rejection, chronic transplant rejection, allograft rejection, graft-versus-host disease, systemic sclerosis, systemic lupus erythematosus, autoimmune inflammatory bowel disease, urinary system inflammatory disease, cardiovascular disease, vasculitis, periodic fever, glucose metabolism disorder, lung disease, cancer, periodontitis, herpetic interstitial keratitis, allergy, inflammatory pain, spondyloarthropathy, sepsis, septic shock or endotoxic shock, meningitis, trauma by surgery, autoimmune blood disorder, Alzheimer's disease, sarcoidosis, cirrhosis, hepatitis (including autoimmune hepatitis), primary biliary cirrhosis, uveitis, thyroiditis, atherosclerosis, alopecia, Wilson's disease, glomerulonephritis and dyslipidemia. Among them, psoriasis is preferable.

As used herein, the term "treatment (treating)" refers to all types of treatments of a disease associated with the expression of IL-23 or symptom thereof, for example, is intended to treat or improve psoriasis and alleviate or inhibit symptoms associated with psoriasis. Also, the term encompasses the prevention of the recurrence of a disease such as psoriasis.

As used herein, the term "prophylaxis" is intended to prevent the development of a disease associated with the expression of IL-23, delay the development of the disease and reduce the risk of developing the disease.

As used herein, the term "patient" refers to human and an animal such as dog, cat and horse. Among them, human is preferable.

As used herein, the term "therapeutically effective amount" refers to an amount that can produce the effects of treating a disease associated with the expression of IL-23 or an amount that can delay the progression of the disease, compared with untreated patients. The term also includes, within its scope, an amount effective to promote normal physiological functions.

The effective amount includes the amount of the double stranded RNA alone of the present invention, the amount of a combination of two or more of the double stranded RNAs of the present invention, and the amount of the double stranded RNA of the present invention in combination with other active ingredient(s) useful for the treatment of a disease associated with the expression of IL-23 such as psoriasis.

The pharmaceutical composition of the present invention may comprise a pharmaceutically acceptable active ingredient other than a double stranded RNA.

The pharmaceutical composition of the present invention may comprise commonly-used known additive(s), for example, an antioxidant, a preservative, a thickener, a preserving agent. The additive may be used alone, or two or more of the additives may be used in combination.

Examples of the antioxidant include ascorbic acid, sodium hydrogen sulfite, sodium sulfite, erythorbic acid, tocopherol acetate, dibutylhydroxytoluene, tocopherol, sodium pyrosulfite, butylhydroxyanisole and propyl gallate. Among them, sodium hydrogen sulfite and propyl gallate are preferable. The amount of the antioxidant in the pharmaceutical composition of the present invention may be appropriately adjusted depending on, for example, the type of the antioxidant. The amount is, for example, 0.001 to 5 w/w %, preferably 0.003 to 2 w/w %, and more preferably 0.005 to 1 w/w %. Also, the antioxidant may be used alone, or two or more of the antioxidants may be used in combination.

Examples of the preservative include benzoic acid, sodium benzoate, sorbic sodium sorbate, sodium dehydroacetate, parahydroxybenzoic acid, sodium parahydroxybenzoate, ethyl parahydroxybenzoate, propyl parahydroxybenzoate (propylparaben), butyl parahydroxybenzoate, isopropyl parahydroxybenzoate, isobutyl parahydroxybenzoate, propionic acid, sodium propionate, benzalkonium chloride and salicylic acid. Among them, methylparaben, propylparaben, benzalkonium chloride, salicylic acid or a mixture thereof is preferable. The amount of the preservative in the pharmaceutical composition of the present invention may be appropriately adjusted depending on, for example, the type of the preservative. The amount is, for example, 0.01 to 0.5 w/w %, preferably 0.02 to 0.3 w/w %, and more preferably 0.03 to 0.2 w/w %. Also, the preservative may be used alone, or two or more of the preservatives may be used in combination.

The thickener encompasses an inorganic material and an organic material. Examples of the inorganic material include amorphous silicon dioxide, kaolin (gypsum), diatomite, talc, hydrated silicon dioxide, light anhydrous silicic acid, magnesium silicate, calcium silicate, calcium phosphate and barium sulfate, and examples of the organic material include crystalline cellulose. Among them, light anhydrous silicic acid is preferable. The amount of the thickener in the pharmaceutical composition of the present invention may be appropriately adjusted depending on, for example, the type of the thickener. The amount is, for example, 0.01 to 10 w/w %, preferably 0.05 to 5 w/w %, and more preferably 0.1 to 1 w/w %. Also, the thickener may be used alone, or two or more of the thickeners may be used in combination.

As the preserving agent, a chelating agent is preferably used to inhibit the degradation of a double stranded RNA. The chelating agent used herein is used to inhibit the activity of DNA degrading enzymes on the skin surface, and thus it is preferably a chelating agent used for removing divalent metal ions such as Zn and more preferably the chelating agent with less skin irritation. Examples of the preserving agent include disodium edetate (EDTA·2Na), acetylacetic acid esters such as methyl acetylacetate, ethyl acetylacetate. Among them, EDTA·2Na is preferable. The amount of the preserving agent in the pharmaceutical composition of the present invention may be appropriately adjusted depending on, for example, the type of the preserving agent. The amount is, for example, 0.05 to 5 w/w %, preferably 0.03 to 3 w/w %, and more preferably 0.01 to 2 w/w %. Also, the preserving agent may be used alone, or two or more of the preserving agents may be used in combination.

The pharmaceutical composition of the present invention is suitable for parenteral (e.g., transdermal) administration. Examples of the parenteral administration of the pharmaceutical composition of the present invention include transdermal administration, enteral administration (e.g., intrarectal transport, intranasal transport), intravascular administration (e.g., intravenous bolus injection, intravenous infusion, intra-arterial bolus injection, intra-arterial infusion, catheter instillation into blood circulatory system), peri- and intra-tissue administration, subcutaneous administration and inhalation administration. Among them, transdermal administration is preferable. Also, the pharmaceutical composition of the present invention may be orally administered.

The amount of the double stranded RNA of the present invention in a pharmaceutical composition for transdermal administration may be any amount that achieves a therapeutically effective amount when the double stranded RNA is transdermally absorbed, but is not particularly limited thereto. The amount is, for example, 0.01 to 5 w/w %, preferably 0.02 to 1 w/w %.

The dosage form of the pharmaceutical composition of the present invention can be optionally selected and prepared according to physical and healthy conditions, etc. of patients. For example, the pharmaceutical composition of the present invention can be prepared as a dosage form for oral administration such as tablet, capsule, granule, powder, solution and syrup, or a dosage form for parenteral administration such as injectable preparation, external preparation, inhalant, suppository, eye drop, ophthalmic ointment, ear drop, nasal drop, topical agent, spray, ointment, cream, gel and patch, according to any conventional method.

When the pharmaceutical composition of the present invention is used as an external preparation, the pharmaceutical composition may be prepared as an external preparation by dissolving a double stranded RNA, which is an active ingredient, in an aliphatic carboxylic acid-based mixed ionic liquid, dissolving the ionic liquid in a base for external preparation or mixing and dispersing them, and suspending the solution. Examples of the base for external preparation include bases used in the preparation of various preparations such as ointment, solution and patch.

Examples of the base for ointment include white petrolatum, liquid paraffin and gelled hydrocarbon. The gelled hydrocarbon means substances in which hydrocarbon such as liquid paraffin, paraffin, isoparaffin, squalane, squalene and polybuten. The gelled hydrocarbon in which liquid paraffin is gelled with polyethylene resin and the gelled hydrocarbon in which an oil is gelled with rubber elastomer are particularly preferable. Examples thereof include Plastibase (trade name) in which liquid paraffin (the Japanese Pharmacopoeia) is gelled with 5 to 10 weight % of polyethylene resin, Poloid (trade name), hydrophilic gelled hydrocarbon in which glycerin fatty acid ester is added to gelled hydrocarbon to give hydrophilicity (Plastibase Hydrophilic (trade name)).

Examples of the base for solution include a mixture solution of an alcohol such as isopropanol, ethanol, propylene glycol, glycerin and an oil such as olive oil and soybean oil.

Examples of the base for patch include adhesive. The adhesive as the base for patch mainly comprises an elastomer and a tackifier, a softening agent, a filler, an antioxidant and the like. The adhesive may not comprise a softening agent, a filler and an antioxidant.

When the pharmaceutical composition of the present invention is used as an external preparation, the amount to be used varies with various factors such as the symptoms and the age of patients. In general, the external preparation is preferably administered to adults once to several times daily. More preferably, the external preparation of the present invention is administered once to twice daily, but the frequency of administration may be increased depending on the symptoms of patients.

EXAMPLES

Hereinafter, the present invention is described more specifically with reference to Examples. However, the present invention is not intended to be limited to them by any means.

Example 1: In Vitro Assessment of Effect of Inhibiting Expression of IL-23 for siRNA (1) Preparation of siRNA Using the base sequence of SEQ ID NO: 1, GC Score (GC ratio in siRNA), Load Score (bias in siRNA internal energy), Position Score (the position in targeted mRNA), Specificity Score (the sequence specificity in genomes), Profile Score (comparison of the common sequence features in active siRNA) were calculated with an sequence design software (SISNIPER), and Total score was calculated from the scores. Then, 5 target sequences with a Total score of 81.0 or more which may produce the effect of inhibiting the expression of IL-23 were selected, siRNA (No. 1) to siRNA (No. 5) were designed from the selected sequences, and each siRNA oligonucleotide was synthesized by a chemical synthesis method. siRNAs (No. 1) to (No. 5) are double stranded RNA having a base sequence selected from SEQ ID NO: 2, SEQ ID NO: 3, SEQ ID NO: 4, SEQ ID NO: 5 or SEQ ID NO: 6 and a target base sequence complementary to thereto, respectively. The base sequence of SEQ ID NO: 1 is a base sequence of the p19 subunit mRNA of hedgehog-derived IL-23 and is 1358 bases in total length, and the sequence information is registered as GenBank Accession No. AF301619 in GenBank.

(2) Assessment of Effect of Inhibiting Expression of IL-23

The effects of inhibiting the expression of IL-23 for the prepared 5 types of siRNAs (No. 1) to (No. 5) were assessed in vitro. Specifically, the dendritic cell lines, JAWSII cells ($2 \times 10^6$ cells/mL) were cultured under 5% $CO_2$ condition at 37° C. for 24 hours, and then 5 types of siRNAs (30 pmol/mL) were introduced into the cells with the transfection reagent, Lipofectamine. After 24 hours, LPS (100 ng/ml) was added thereto and the cells were collected and dissolved after additional 6 hours to prepare a cell lysate. IL-23 in the cell lysate was assessed by the Western blotting. A cell lysate without siRNA and LPS, a cell lysate with LPS alone, and a cell lysate with siRNA against GFP which is siRNA inhibiting no IL-23 expression and LPS were used as controls.

The results of the Western blotting in controls (Control, LPS alone, LPS+GFP siRNA) and siRNA (No. 1) to siRNA (No. 5) of the present invention are shown in FIG. 1. FIG. 1 shows the ratios of the expressed amounts of IL-23 in Control, GFP siRNA and siRNA (No. 1) to siRNA (No. 5) to the expressed amount of IL-23 in the cell lysate containing LPS alone defined as 1. In FIG. 1, it is shown that the expressed amount of IL-23 is increased by the addition of IPS and the expressed amount of IL-23 is reduced by the addition of siRNAs of the present invention. Also, it was observed that the expressed amount of IL-2 by the addition of siRNA (No. 2) was lowest. As a result, siRNA (No. 2) was used as siRNA for the following tests.

Example 2: In Vivo Skin Permeation Test of Preparation Comprising siRNA (1) Preparation of preparation comprising siRNA Each ingredient was weighed in the amounts shown in Table 3 below, and the preparation comprising siRNA was prepared according to the following procedure.

Levulinic acid and triethanolamine were mixed to prepare an ionic liquid (hereinafter referred to as "ionic liquid A"). To the prepared ionic liquid A were added sodium hydrogen sulfite and propyl gallate and dissolved at 60° C., and then siRNA was further added thereto and dissolved at 60° C. to prepare siRNA-containing ionic liquid A solution. Separately, stearic acid and diisopropanolamine were mixed and dissolved to prepare an ionic liquid (hereinafter referred to as "ionic liquid B"). The siRNA-containing ionic liquid A solution and the ionic liquid B were mixed to prepare a solution as a drug solution. The drug solution, sodium edetate, light anhydrous silicic acid and gelled hydrocarbon were mixed to prepare an ointment preparation.

TABLE 3

| Ingredient | w/w % |
| --- | --- |
| siRNA (No.2) | 0.02 |
| Levulinic acid | 0.35 |
| Triethanolamine | 0.45 |
| Isostearic acid | 2.5 |
| Diisopropanolamine | 1.17 |
| Sodium edetate | 0.5 |
| Propyl gallate | 0.01 |
| Sodium hydrogen sulfite | 0.001 |
| Light anhydrous silicic acid | 0.25 |
| Gelled hydrocarbon | Residual quantity |
| Total | 100 |

(2) Preparation of Psoriasis Model Mouse

According to the procedure described in J. Control. Release, 2017, 246, 120-132, psoriasis model mouse was prepared using a mouse. Specifically, the back of 5-week old male C57BL/6N mouse (Supplier: Japan SLC, Body weight: about 20 g) was shaved, and imiquimod cream (Beselna cream 5%, Mochida Pharmaceutical Co., Ltd.) was applied to the shaved back thereof at 60 mg once daily for 4 days to induce the symptoms of psoriasis in the mouse.

In the mouse, erythema with inflammation, skin thickness caused by hyperproliferation of corneocytes and the increased expressed amount of IL-23 were observed. The symptoms of the mouse were the same as those of psoriasis. As a result, it was shown that the mouse could be used as psoriasis model mouse.

(3) In Vivo Skin Permeation Test of siRNA

In order to confirm which site of the skin siRNA reaches when the siRNA-containing preparation prepared in the above (1) was applied as described above, the skin permeation test of siRNA was performed by applying a siRNA-containing preparation fluorescently labeled with FAM (test preparation) to the back of mouse. As control preparation, the siRNA-containing preparation prepared in the above (1) in which levulinic acid, triethanolamine, isostearic acid and diisopropanolamine are not added was used.

The test preparation and control preparation were applied to each shaved back of normal mouse (C57BL/6N mouse) and psoriasis model mouse, the skin of the applied site in each mouse was collected 6 hours after the application to the shaved back, frozen section was made from the collected skin according to the usual method, and the distribution of the fluorescently-labeled siRNA in skin tissue was observed by a fluorescence microscope.

The results of the distribution of siRNA in the skin tissue in the absence and presence of an ionic liquid for normal mouse and psoriasis model mouse are shown in FIG. 2. In the preparation comprising no ionic liquid, no permeation of siRNA into the skin was observed in both normal mouse and psoriasis model mouse. On the other hand, in the preparation comprising an ionic liquid, most of siRNAs were observed near the stratum corneum on the skin surface of both normal mouse and psoriasis model mouse, and some siRNAs were observed in the epidermis.

Langerhans cells express IL-23 and are distributed in the epidermis. As a result, it was shown that the applied siRNAs could reach target cells.

Example 3: Test on Medicinal Effect of Preparation Comprising siRNA in Mild Psoriasis Model Mouse The therapeutic effect of the siRNA of the present invention on psoriasis was assessed using mild psoriasis model mouse. Firstly, C57BL/6N mice (20 mice) were randomly classified into the untreated group, the siRNA treatment group and the tacrolimus treatment group for psoriasis model mouse as well as the normal mouse group (n=5 per group). Then, according to a similar procedure to that of Example 2 (2), the back of each mouse was shaved and imiquimod cream (Mochida Pharmaceutical Co., Ltd.) was applied to the shaved back thereof for 4 days, the applied area was treated with the preparation comprising siRNA prepared in Example 2 (1) or commercially available tacrolimus ointment 0.1% (POLA PHARMA) from the 5th day at 100 mg once daily for 3 days, and the skin of the treated area was collected on the 8th day to make frozen sections of the siRNA treatment group and tacrolimus treatment group from the collected skin. Also, the area of the mouse in which imiquimod crease was applied for 4 days was not treated from the 5th day and the skin of the untreated area was collected on the 8th day to make the frozen section of the untreated group. HE staining and immunostaining with the cell proliferation marker, Ki-67 were performed for the sections, and the thickness of the epidermis and the skin hyperproliferation were assessed. The untreated and tacrolimus treatment groups were used as control groups. In addition, the thickness of the epidermis and the skin hyperproliferation were also compared with those of the skin of normal mouse.

The images of the skin tissues with HE staining for normal mouse and mild psoriasis model mouse (the untreated group, the siRNA treatment group and the tacrolimus treatment group) as well as the thickness of the epidermis (μm) in each mouse are shown in FIG. 3, and the images of the skin tissues immunostained with Ki-67 for normal mouse and mild psoriasis model mouse of each group are shown in FIG. 4.

The thickness of the skin and the hyperproliferation of cells were observed in the mice of the untreated group, but some mice showed a tendency to naturally cure the symptoms. It was confirmed that the siRNA treatment and tacrolimus treatment improved the skin symptoms for all of the mice, and the skins of the mice recovered to the same extent as that of normal mice. The difference between the effects in the siRNA and tacrolimus treatment groups was not observed.

The results of this test showed that the siRNA preparation of the present invention produced similar therapeutic effects to the existing medicaments for treating psoriasis. In addition, it was shown that the preparation comprising siRNA of the present invention produced an excellent skin permeability and could be used as a preparation for transdermal administration.

Example 4: Test on Medicinal Effect of siRNA-Containing Preparation in Severe Psoriasis Model Mice Psoriasis The therapeutic effect of the siRNA of the present invention on psoriasis was assessed using severe psoriasis model mice. Firstly, C57BL/6N mice (15 mice) were randomly classified into the untreated group, the siRNA (IL-23 siRNA and GFP siRNA) treatment groups and the tacrolimus treatment group for psoriasis model mouse as well as the normal mouse group (n=3 per group). Then, according to a similar procedure to that of Example 2 (2), the back of each mouse was shaved and imiquimod cream was continuously applied to the shaved back thereof for 7 days, the applied area was treated with the preparation comprising siRNA prepared in Example 2 (1), commercially available tacrolimus ointment or GFP siRNA from the 5th day at 100 mg once daily for 3 days, and the skin of the treated area was collected on the 8th day to make frozen sections of the IL-23 siRNA treatment group, tacrolimus treatment group and the GFP siRNA treatment group from the collected skin. Also, the area of the mouse in which imiquimod crease was applied for 4 days was not treated from the 5th day and the skin of the untreated area was collected on the 8th day to make the frozen section of the untreated group. HE staining and immunostaining with the cell proliferation marker, Ki-67 were performed for the sections, and the thickness of the epidermis and the skin hyperproliferation were assessed. The untreated group, the tacrolimus treatment group and the GFP siRNA treatment group were used as control groups. In addition, the thickness of the epidermis and the skin hyperproliferation were also compared with those of the skin of normal mouse.

The images of the skin tissues with HE staining for normal mouse and severe psoriasis model mouse (the untreated group, the GFP siRNA treatment group, the IL-23 siRNA treatment group and the tacrolimus treatment group) as well as the thickness of the epidermis (μm) for each mouse are shown in FIG. 5, the images of the skin tissues immunostained with Ki-67 for normal mouse and severe psoriasis model mouse of each group are shown in FIG. 6, and the results of each Western blotting of the untreated group, the GFP siRNA treatment group and the IL-23 siRNA treatment group for severe psoriasis model mouse as well as the expressed amounts of IL-23 in the skin tissues of each group are shown in FIG. 7.

It was shown in FIG. 5 and FIG. 6 that the siRNA of the present invention also produced the effects of treating the severe symptoms of psoriasis. Also, it was shown in FIG. 7 that the siRNA of the present invention produced the effects of reducing the thickness of the epidermis, inhibiting the proliferation of keratinocytes and reducing the expressed amounts of IL-23, but the effects were not observed in the treatment with GFP siRNA.

The results of this test showed that the siRNA preparation of the present invention also produced the effects of treating the severe symptoms of psoriasis and suggested that the effect was mediated by the specific inhibition of IL-23.

Example 5: Test on Stability of siRNA with Ionic Liquid

The effects of stabilizing siRNA with an ionic liquid was assessed. Specifically, siRNA (No. 2) (0.02 w/w %) was dissolved in the ingredients for forming an ionic liquid (levulinic acid, triethanolamine, isostearic acid, diisopropanolamine) in the amounts shown in Table 3 above, the solution was diluted with water to prepare siRNA solution, and the CD spectrum of the resulting siRNA solution was measured with a circular dichroism spectrometer J-1500 (JASCO Corporation). As control, siRNA solution in which siRNA is dissolved in water and a mixture of the above ingredients for forming an ionic liquid and water were used.

In addition, GFP siRNA disclosed in the above ingredients for forming an ionic liquid prepared in a similar procedure to the above procedure and fetal bovine serum (Sigma) were mixed in a volume ratio of 1:1, the mixture was incubated at 37° C. for 30 minutes, and the degradation of siRNA was observed by agarose gel electrophoresis to assess the stability of siRNA. Also, the stability of siRNA was assessed in the absence of serum. The substances in which siRNA was diluted with Tris-EDTA buffer (TE), HEPES buffer (HBS), or RPMI1640 medium (FUJIFILM Wako Pure Chemical Corporation) were used as control.

The CD spectra of siRNA dissolved in an ionic liquid, siRNA and the ionic liquid were shown in FIG. 8, and the results of agarose gel electrophoresis of siRNA dissolved in the dilution solvent (TE, HBS, RPMI1640 medium or ionic liquid (IL)) were shown in FIG. 9. The results showed that the dissolution of siRNA in an ionic liquid stabilizes the linkage between two strands of siRNA. Also, it was shown that siRNA was degraded into serum by dissolving siRNA in another solvent other than the ionic liquid, but the degradation of siRNA was inhibited by dissolving siRNA in the ionic liquid.

The results in this test showed that an ionic liquid was involved in the improved stability of siRNA.

INDUSTRIAL APPLICABILITY

The double stranded RNA of the present invention can specifically inhibit the expression of IL-23, and thus can be used for the treatment of a disease associated with IL-23 such as psoriasis. Also, the pharmaceutical composition of the present invention can produce high stability of the double stranded RNA, which is an active ingredient, in the pharmaceutical composition and high skin permeability of the double stranded RNA and effectively deliver the double stranded RNA in each affected area by the use of an ionic liquid, and thus can be used as a transdermal absorption preparation. The double stranded RNA of the present invention is highly stable in a preparation, and thus can be used in low amounts and is expected to be used as an agent for treating psoriasis with more excellent stability and economy.

The invention claimed is:

1. A double stranded RNA comprising a sense strand and an antisense strand, wherein each of the strands has 19 to 30 nucleotides and comprises a base sequence selected from SEQ ID NO: 2, SEQ ID NO: 3, SEQ ID NO: 4, SEQ ID NO: 5 or SEQ ID NO: 6 or a complementary base sequence thereof.

2. The double stranded RNA according to claim 1, wherein each of the strands has 19 to nucleotides.

3. The double stranded RNA according to claim 1, wherein one or more nucleotides within each of the strands are chemically modified or the 5'-terminal or 3'-terminal nucleotide in each of the strands is chemically modified.

4. The double stranded RNA according to claim 3, wherein said chemical modification is selected from the group consisting of phosphorothioate modification, 2'-F modification, 2'-OMe modification, 2'-MOE modification, LNA modification and ENA modification.

5. The double stranded RNA according to claim 1, which comprises 1 to 10 deoxyribonucleotides in the 3'-end of the sense strand and the 5'-end of the antisense strand.

6. The double stranded RNA according to claim 5, which comprises 2 thymidines (dTs) in the 3'-end of the sense strand and the 5'-end of the antisense strand.

7. The double stranded RNA according to claim 1 for specifically inhibiting the expression of IL-23.

8. A pharmaceutical composition comprising the double stranded RNA according to claim 1.

9. The pharmaceutical composition according to claim 8, which further comprises an aliphatic carboxylic acid-based ionic liquid.

10. The pharmaceutical composition according to claim 9, wherein the aliphatic carboxylic acid-based ionic liquid is a mixed ionic liquid comprising two or more aliphatic carboxylic acid-based ionic liquids.

11. The pharmaceutical composition according to claim 10, wherein the mixed ionic liquid is
   a) one or more aliphatic carboxylic acid-based ionic liquids of 2 to 7 carbon atoms consisting of a lower aliphatic carboxylic acid of 2 to 7 carbon atoms and any of ethanolamine, diethanolamine or triethanolamine, and
   b) an aliphatic carboxylic acid-based ionic liquid of 2 to 20 carbon atoms in which the solubility of the double stranded RNA is 1 w/w % or less.

12. The pharmaceutical composition according to claim 8 which is a transdermal absorption preparation.

13. The pharmaceutical composition according to claim 8 for treating a disease associated with the expression of IL-23.

14. The pharmaceutical composition according to claim 13, wherein the disease is psoriasis.

* * * * *

SEQUENCE LISTING

<160> NUMBER OF SEQ ID NOS: 21

<210> SEQ ID NO 1
<211> LENGTH: 1358
<212> TYPE: DNA
<213> ORGANISM: Mus musculus

<400> SEQUENCE: 1

```
cgcttagaag tcggactaca gagttagact cagaaccaaa ggaggtggat aggggtcca        60 caggcctggt gcagatcaca gagccagcca gatctgagaa gcagggaaca agatgctgga       120
ttgcagagca gtaataatgc tatggctgtt gccctgggtc actcagggcc tggctgtgcc       180
taggagtagc agtcctgact gggctcagtg ccagcagctc tctcggaatc tctgcatgct       240
agcctggaac gcacatgcac cagcgggaca tatgaatcta ctaagagaag aagaggatga       300
agagactaaa aataatgtgc cccgtatcca gtgtgaagat ggttgtgacc cacaaggact       360
caaggacaac agccagttct gcttgcaaag gatccgccaa ggtctggctt tttataagca       420
cctgcttgac tctgacatct tcaaagggga gcctgctcta ctccctgata gccccatgga       480
gcaacttcac acctccctac taggactcag ccaactcctc cagccagagg atcacccccg       540
ggagacccaa cagatgccca gcctgagttc tagtcagcag tggcagcgcc cccttctccg       600
ttccaagatc cttcgaagcc tccaggcctt tttggccata gctgcccggg tctttgccca       660
cggagcagca actctgactg agcccttagt gccaacagct taaggatgcc caggttccca       720
tggctaccat gataagacta atctatcagc ccagacatct accagttaat taacccatta       780
ggacttgtgc tgttcttgtt tcgtttgttt tgcgtgaagg gcaaggacac cattattaaa       840
gagaaaagaa acaaacccca gagcaggcag ctggctagaa aaaggagctg gagaagaaga       900
ataaagtctc gagcccttgg ccttggaagc gggcaagcag ctgcgtggcc tgaggggaag       960
ggggcggtgg catcgagaaa ctgtgagaaa acccagagca tcagaaaaag tgagcccagg      1020
ctttggccat tatctgtaag aaaaacaaga aaggggaac attatacttt cctgggtggc      1080
tcagggaaat gtgcagatgc acagtactcc agacagcagc tctgtacctg cctgctctgt      1140
ccctcagttc taacagaatc tagtcactaa gaactaacag gactaccaat acgaactgac      1200
```

```
aaatactacc actatgacct gtgacaaagc tgcatattta ttaagtggga agggaacttt    1260
tgatattatt tatccttgta acagtataga tgatggttat ttattctatt tataaggaat    1320
tatgtatttt tttttcaata aagatttatt tatgtggc                            1358
```

<210> SEQ ID NO 2
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 2
ccuaacgucu cgucauuau                                                 19

<210> SEQ ID NO 3
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 3
gcccuguaua cuuagauga                                                 19

<210> SEQ ID NO 4
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 4
cuccuacuuc ucugauuuu                                                 19

<210> SEQ ID NO 5
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 5
cgguuccaga ccgaaaaau                                                 19

<210> SEQ ID NO 6
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 6
cuucggaggu ccggaaaaa                                                 19

<210> SEQ ID NO 7
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 7
ggauugcaga gcaguaaua                                                 19

<210> SEQ ID NO 8
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 8
cgggacauau gaaucuacu                                                    19

<210> SEQ ID NO 9
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 9
gaggaugaag agacuaaaa                                                    19

<210> SEQ ID NO 10
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 10
gccaaggucu ggcuuuuua                                                    19

<210> SEQ ID NO 11
<211> LENGTH: 19
<212> TYPE: RNA
<213> ORGANISM: Artificial Sequence
<220> FEATURE:
<223> OTHER INFORMATION: Synthetic Oligonucleotide

<400> SEQUENCE: 11
gaagccucca ggccuuuuu                                                    19

<210> SEQ ID NO 12
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 12
ttccuaacgu cucgucauua u                                                 21

<210> SEQ ID NO 13
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 13
ttgcccugua uacuuagaug a                                                 21

<210> SEQ ID NO 14
<211> LENGTH: 21
<212> TYPE: DNA
<213> ORGANISM: Artificial Sequence

```
<220> FEATURE:
<223> OTHER INFORMATION: Combined DNA/RNA Molecule: Synthetic
      Oligonucleotide

<400> SEQUENCE: 14
ttcuccuacu ucucugauuu u                                              21

<210> SEQ ID NO 15
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 15
ttcgguucca gaccgaaaaa u                                              21

<210> SEQ ID NO 16
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 16
ttcuucggag guccggaaaa a                                              21

<210> SEQ ID NO 17
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 17
ggauugcaga gcaguaauat t                                              21

<210> SEQ ID NO 18
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 18
cgggacauau gaaucuacut t                                              21

<210> SEQ ID NO 19
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 19
gaggaugaag agacuaaaat t                                              21

<210> SEQ ID NO 20
<211> LENGTH: 21
<212> TYPE: DNA
<213> ORGANISM: Artificial Sequence
<220> FEATURE:
```

```
<223> OTHER INFORMATION: Combined DNA/RNA Molecule: Synthetic
      Oligonucleotide

<400> SEQUENCE: 20
gccaaggucu ggcuuuuuat t                                        21

<210> SEQ ID NO 21
<211> LENGTH: 21
<212> TYPE: DNA
<213> ORGANISM: Artificial Sequence
<220> FEATURE:
<223> OTHER INFORMATION: Combined DNA/RNA Molecule: Synthetic
      Oligonucleotide

<400> SEQUENCE: 21
gaagccucca ggccuuuuut t                                        21
```